(12) United States Patent  (10) Patent No.: US 7,731,111 B2
Roy  (45) Date of Patent: Jun. 8, 2010

(54) APPARATUS AND METHOD FOR PROCESSING VEGETATIVE MATERIAL

(75) Inventor: Andre Roy, Livermore, CO (US)

(73) Assignee: Mill Creek Enterprises, Inc., Berthoud, CO (US)

( * ) Notice: Subject to any disclaimer, the term of this patent is extended or adjusted under 35 U.S.C. 154(b) by 1000 days.

(21) Appl. No.: 11/279,738

(22) Filed: Apr. 13, 2006

(65) Prior Publication Data

US 2007/0243018 A1   Oct. 18, 2007

(51) Int. Cl.
  B27K 7/00 (2006.01)
  B27K 9/00 (2006.01)
  B27L 11/00 (2006.01)
  D21D 1/30 (2006.01)
(52) U.S. Cl. ........................ 241/28; 241/184
(58) Field of Classification Search .............. 241/28, 241/184, 74, 79.3
  See application file for complete search history.

(56) References Cited

U.S. PATENT DOCUMENTS

| 744,451 | A | | 11/1903 | Abbe | |
|---|---|---|---|---|---|
| 1,449,751 | A | * | 3/1923 | Hardinge | 241/153 |
| 1,525,790 | A | * | 2/1925 | Bartley | 241/176 |
| 1,607,828 | A | * | 11/1926 | Holthoff | 241/102 |
| 1,654,624 | A | | 1/1928 | Wells | |
| 1,807,383 | A | | 5/1931 | Carnahan | |
| 1,860,393 | A | * | 5/1932 | Newhouse | 241/184 |
| 1,959,902 | A | | 5/1934 | Carnahan | |
| 2,232,696 | A | | 2/1941 | Earle | |
| 2,323,544 | A | * | 7/1943 | Kiesskalt et al. | 241/137 |
| 2,653,769 | A | * | 9/1953 | Hall | 241/137 |
| 3,124,314 | A | * | 3/1964 | Klein | 241/172 |
| 3,318,538 | A | * | 5/1967 | Needham | 241/178 |
| 3,521,825 | A | * | 7/1970 | Morcom | 241/26 |
| 3,811,624 | A | * | 5/1974 | Giorgi | 241/176 |
| 3,920,191 | A | | 11/1975 | Bradley | |
| 5,133,506 | A | * | 7/1992 | Bogen | 241/46.17 |
| 5,374,293 | A | | 12/1994 | Takashita et al. | |
| 5,650,065 | A | | 7/1997 | Sewell | |
| 6,070,817 | A | * | 6/2000 | Yanase | 241/171 |
| 6,293,480 | B1 | * | 9/2001 | Tseng | 241/184 |
| 6,634,574 | B1 | | 10/2003 | Eisfeld | |

OTHER PUBLICATIONS

US Environmental Protection Agency, In-Vessel Composting of Biosolids; Biosolids Technology Fact Sheet, Sep. 2000, US Environmental Protection Agency, US.
International Search Report for PCT/US07/64835, International Searching Authority, Sep. 29, 2008, p. 1-3.

* cited by examiner

*Primary Examiner*—Bena Miller
(74) *Attorney, Agent, or Firm*—Samuel M. Freund; Cochran Freund & Young LLC

(57) ABSTRACT

An apparatus and method for generating a chosen, relatively uniform size of particles having a dry-to-the-touch feel and a pleasant odor from chipped slash or other vegetative material is described. When pine sap and/or other liquids are present in the starting materials, the teachings of the present invention permit the generation of particulates into which such substances are substantially uniformly absorbed. The process of the present invention has been successfully applied to chipped, live trees, dried tree materials, branches, needles, pine cones, hay, flowers, grass, berries, and shrubs.

19 Claims, 1 Drawing Sheet

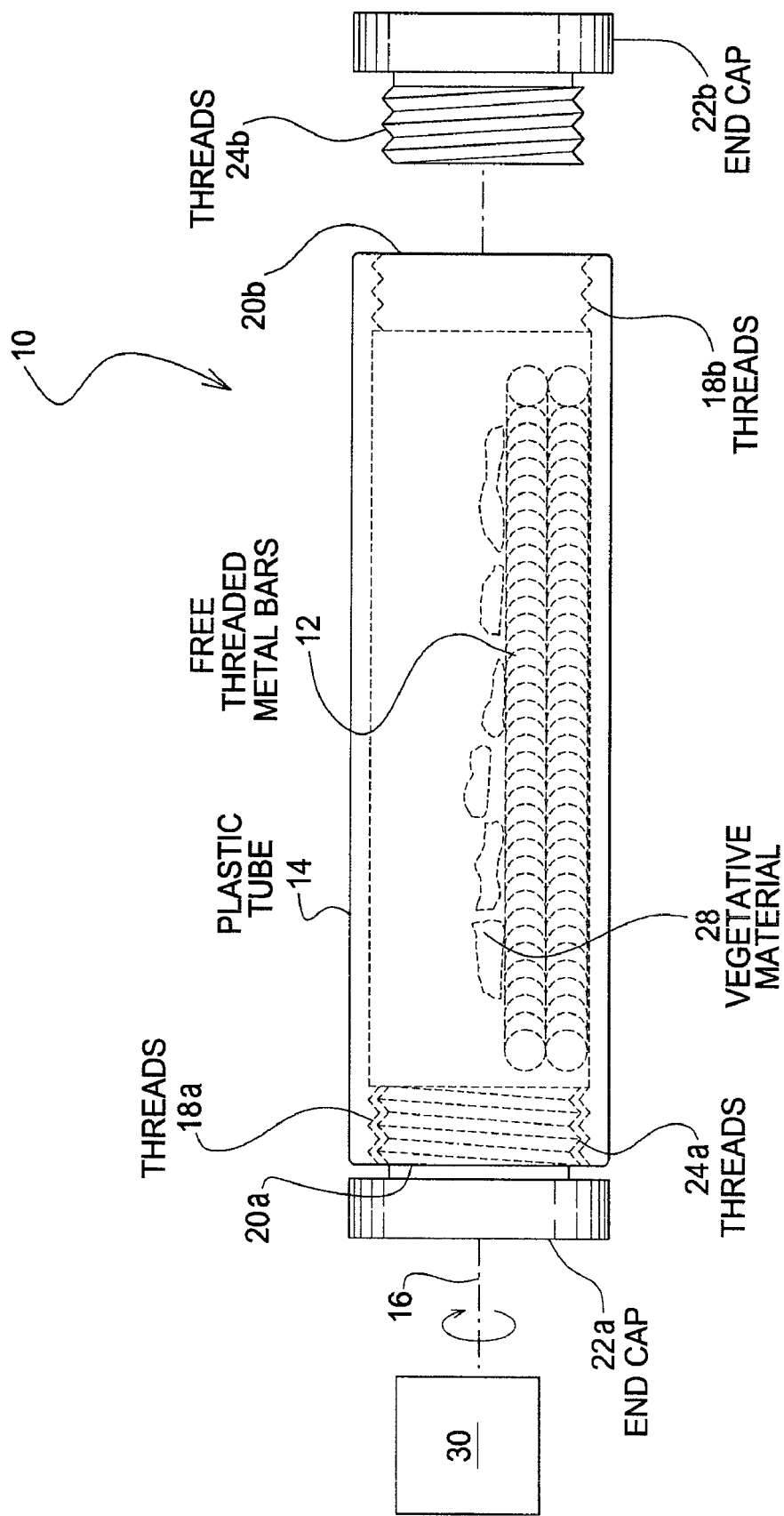

APPARATUS AND METHOD FOR PROCESSING VEGETATIVE MATERIAL

FIELD OF THE INVENTION

The present invention relates generally to processing vegetative material and, more particularly, to an apparatus and method for homogenizing vegetative material including plants, woody plants, and agricultural waste.

BACKGROUND OF THE INVENTION

Tree logging, thinning of young timber and clearing operations for constructing through forested areas have the undesirable effect of generating quantities of slash or forest residue which often must be removed from the operation site. Slash generally includes unused portions of a tree including tree tops, limbs, cull logs, stumps and roots, often amounting to as much as 50% of a tree. Forest residue can also include small trees and fallen or decayed trees. Slash is usually burned or deposited in landfill areas since accumulation thereof in forested areas creates fire hazards and breeding sites for insects, and adversely affects wildlife, water-sheds, and forest aesthetics.

Toppled or uprooted trees and other plants including shrubs and bushes are also removed to landfill sites after storms bearing high winds, flooding, landslides and the like. Other vegetative material resulting from gardening, landscaping and agriculture often finds its way to land fill sites as well or is incinerated if it cannot otherwise be used as silage or directly for fodder.

Processing slash and live trees to form relatively uniform, finely divided particles suitable for applications where consistency of nutrient release or more rapid reaction with chemical agents is desired. It is difficult to generate such uniformity from forest and agricultural material, since the cutting blades of presently available fine shredding mills are quickly halted as a result of the release of pine sap and/or other sticky materials into the resulting mixture as the trees are being processed. Chipping and chopping of such materials are more tolerant to the present of sticky substances because of the use of larger cutting blades and significant power employed by such devices.

Accordingly, it is an object of the present invention to provide a method and apparatus for processing vegetative material.

It is another object of the invention to provide a method and apparatus for transforming waste vegetative material into useful materials.

Another object of the invention is to provide finely divided particles having substantially similar size from slash and agricultural materials.

Still another object of the invention is to provide finely divided particles into which pine sap and other liquids are absorbed, from slash containing coniferous plants.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for processing vegetative material hereof includes the steps of: loading a chosen quantity of the vegetative material into a cylindrical plastic tube having a cylindrical axis disposed approximately horizontally, and containing at least one free metal rod; and rotating the cylinder about the cylindrical axis for a chosen period of time, wherein particles of the vegetative material having a selected particle size are formed.

In another aspect of the present invention, in accordance with its objects and purposes, the composition hereof formed by the process including the steps of: loading a chosen quantity of vegetative material into a cylindrical plastic tube having a cylindrical axis disposed approximately horizontally, and containing at least one free metal rod; and rotating the cylinder about the cylindrical axis for a chosen period of time, wherein particles of said vegetative material having a selected particle size are formed.

In yet another aspect of the present invention, in accordance with its objects and purposes, the apparatus for processing vegetative material hereof includes in combination: a cylindrical plastic tube having a cylindrical axis disposed approximately horizontally; at least one free metal rod disposed in the plastic tube; and means for rotating the cylinder about the cylindrical axis for a chosen period of time, wherein particles of the vegetative material having a chosen particle size are formed.

Benefits and advantages of the present invention include, but are not limited to providing substantially uniform, finely divided particulates from vegetative matter including slash or other plant material which are useful for applications requiring high surface contact are and consistent reaction of materials. Further, in situations where significant pine sap, water or other liquids are present in the starting materials, these liquids appear to be substantially homogeneously infused into the particles.

BRIEF DESCRIPTION OF THE DRAWINGS

The accompanying drawing, which is incorporated in and forms a part of the specification, illustrates an embodiment of the apparatus of the present invention and, together with the description, serves to explain the principles of the invention. In the drawing:

The FIGURE is a schematic representation of a side view of the apparatus of the present invention showing the plastic cylindrical processing vessel having screw-in end caps, and the at least one metal bar thereof.

DETAILED DESCRIPTION OF THE INVENTION

Briefly, the present invention includes a composition and an apparatus and method for generating a chosen, relatively uniform size of particles having a dry feel and a pleasant odor from chipped slash or other vegetative material. In the situation where the starting materials are of substantially identical substances, such as hay, flowers, grass, or pine needles, as examples, the process material is substantially uniform both in particle size and composition. When pine sap and/or other liquids are present in the starting materials, the present invention permits the generation of particulates into which such substances are substantially uniformly absorbed. The composition hereof finds use as fertilizer or soil amendment, feed, absorbent, traction aid, and potpourri, as examples.

Reference will now be made in detail to the present embodiment of the present invention, examples of which are illustrated in the accompanying drawing. Turning now to the FIGURE, a schematic representation of a side view of an embodiment of the apparatus, 10, of the present invention is shown. At least one, free, metal bar, 12, is disposed inside plastic cylinder, 14, having its axis, 16, oriented horizontally. Plastic cylinder 14 is shown to have internal threads, 18a, and 18b in the vicinity of open ends, 20a and 20b. End caps, 22a and 22b, having threads 24a and 24b, respectively, adapted to be screwed into threads 18a and 18b, respectively, provide a barrier to liquid flow out of plastic cylinder 14, but not necessarily a gas-tight barrier, while permitting vegetative material, 26, to be introduced and processed materials removed from plastic cylinder 14. After loading with bars or rods 12, and a selected amount of vegetative material, 28, plastic cylinder 14 is rotated about axis 16, at a selected speed for a chosen period of time using a commercially available ball mill, 30. The processing is stopped when particles of vegetative material having a chosen size are formed in significant quantities. The mixture may then be screened or sieved to pass particles having smaller than a selected dimension, and the remainder of the material is returned to the cylinder for further processing. It should be mentioned that the longer the processing, the smaller the particle size of the resulting vegetative material. In the situation when hay, flowers, grass or pine needles, as examples, are used for the starting material, a fine dust will result if the processing is permitted to continue for a sufficiently long period.

As currently understood by the present inventor, and in no way intended to limit the scope of the present invention, the rods slowly crush and grind the vegetative material and chipped tree parts and, in the case of threaded rods, may also tear apart the previously chipped tree parts (typically, approximately ½ in. to ¾ in. starting size), allowing pine sap, in the case of pine wood slash, and other liquids to be intimately mixed with the smaller, higher surface area pieces. A substantially uniform mixture of flowing, substantially dry-to-the-touch particles which are easy to pour and otherwise handle, and which have a pleasant odor is formed after an appropriate processing time. In situations where the wood is too green or the speed of processing is too rapid, a liquid may be formed. If this liquid is permitted to stand for a selected period in an open, stationary (non-rotating) tube, and the tube rotation is recommenced after this period, the substantially uniform, dry-to-the-touch particles are formed after a time. Such liquefaction has also been observed when the present apparatus is used for processing pine needles, flowers, pine cones, hay, grass, berries, and shrubs. Particles having the size of fine dust particles to particles having a size of approximately, 2 mm, after sieving, are formed before product collection is undertaken; however, larger particles may also find use.

It has been found that "seasoned" acrylonitrile-butadiene-styrene copolymer cylinders 14 give better material conversion than vinyl or acrylic tubes. Seasoning is achieved by processing a few batches of vegetative material. Although end caps 22a and 22b make the assembled plastic tube/end cap combination water tight, it is expected that gases and vapors may pass through threaded portions 18a, 24a and 18b, 24b. Nickel-plated, all thread rods 12 have been found to perform better than unthreaded steel rods which become coated with material during processing and must be periodically cleaned or the processing takes longer. Steel rods also corrode. The nickel plated rods remain bright after months of use. Chrome-plated steel, ball mill balls (½ in. to ¾ in. in diameter) have been found not to work well. It should be mentioned that during processing, small particles of the vegetative materials cling to the rods, apparently by electrostatic forces. It has been found that three threaded nickel-plated rods having a ½ in. to ¾ in. diameter, and a length shorter than the interior length dimension of the cylinder having the end caps in place along the cylindrical axis, process the vegetative material efficiently, while not taking up too much of the volume of the cylindrical tube and permit the rods to freely move within the tube. It is expected that unthreaded nickel-plated rods will perform effectively. Clearly, the number, type, length, and diameter of the rods is provided only as an example, and other combinations and mixtures of rods may be effective in the practice of the present invention.

Having generally described the present method, more details thereof are presented in the following EXAMPLE.

EXAMPLE

A commercial ball mill was operated at 91 rpm, and a 22 in. long×4.5 in. outer diameter ABS cylindrical tube containing three, ½ in. to ½ in. diameter, approximately 20 in. long nickel-plated threaded metal rods which allows about 1 in. play on each side of the closed cylinder, and approximately 2 quarts of chipped pine tree, was placed on the rollers and rotated for about 5 h to achieve a product which will pass through a 2 mm screen, and having approximately fine dust to 2 mm particle sizes. It was found that processing time can be reduced by periodically removing particles smaller than a chosen dimension by screening or sieving.

The process of the present invention has been successfully applied to chipped, live trees, cut trees, dried tree materials, branches, needles, pine cones, hay, flowers, grass and shrubs. As stated hereinabove, care must be taken if the starting materials are too fresh and moist, since such starting materials may generate a dark, moist, fermented product. If this product is removed from the cylinder and allowed to dry, or allowed to dry in the cylinder, with subsequent continuation of the processing, the desired final product is the normally obtained product. To avoid this intermediate drying step however, before chipping, cut live trees may be allowed to stand for between about two weeks to a month.

Chipped pine tree materials weigh about 7 lbs. per cubic foot, while the processed material weighs about 14 lbs. per cubic foot.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for processing vegetative material, comprising the steps of:
   loading a chosen quantity of the vegetative material into a cylindrical plastic tube having a cylindrical axis disposed approximately horizontally and end caps for providing a water-tight seal therewith, and containing at least one free metal rod; and
   rotating the cylinder about the cylindrical axis for a chosen period of time.

2. The method of claim 1, wherein the plastic tube comprises acrylonitrile-butadiene-styrene copolymer.

3. The method of claim 1, wherein the at least one metal rod comprises at least one nickel-plated metal rod.

4. The method of claim 1, wherein the at least one metal rod comprises at least one threaded metal rod.

5. The method of claim 1, wherein the longer the chosen period of time, the smaller the particles of the vegetative material become.

6. The method of claim 1, further comprising the step of passing the particles of vegetative material through a screen selected for passing particles smaller than a chosen particle size.

7. The method of claim 1, wherein the vegetative material is selected from the group consisting of: live trees, cut trees, dried tree materials, branches, needles, pine cones, hay, flowers, grass, berries, and shrubs.

8. A composition formed by the process comprising the steps of: loading a chosen quantity of vegetative material into a cylindrical plastic tube having a cylindrical axis disposed approximately horizontally and end caps for providing a water-tight seal therewith, and containing at least one free metal rod; and rotating the cylinder about the cylindrical axis for a chosen period of time.

9. The composition of claim 8, wherein the plastic tube comprises acrylonitrile-butadiene-styrene copolymer.

10. The composition of claim 8, wherein the at least one metal rod comprises at least one nickel-plated metal rod.

11. The composition of claim 8, wherein the at least one metal rod comprises at least one threaded metal rod.

12. The composition of claim 8, wherein the longer the chosen period of time, the smaller the particles of vegetative material become.

13. The composition of claim 8, wherein said process further comprises the step of passing the particles of vegetative material through a screen selected to pass particles smaller than a chosen particle size.

14. The composition of claim 8, wherein the vegetative material is selected from the group consisting of: live trees, cut trees, dried tree materials, branches, needles, pine cones, hay, flowers, grass, berries, and shrubs.

15. An apparatus for processing vegetative material which comprises in combination:
 a cylindrical plastic tube having a cylindrical axis adapted for receiving said vegetative material and disposed approximately horizontally;
 end caps effective for providing a water-tight seal with said plastic tube;
 at least one free metal rod disposed in said plastic tube; and
 means for rotating said cylinder about the cylindrical axis for a chosen period of time.

16. The apparatus of claim 15, wherein said plastic tube comprises acrylonitrile-butadiene-styrene copolymer.

17. The apparatus of claim 15, wherein said at least one metal rod comprises at least one nickel-plated metal rod.

18. The apparatus of claim 15, wherein said at least one metal rod comprises at least one threaded metal rod.

19. The apparatus of claim 15, wherein said means for rotating said cylinder about the cylindrical axis comprises a ball mill.

* * * * *